United States Patent Office 2,842,162
Patented July 8, 1958

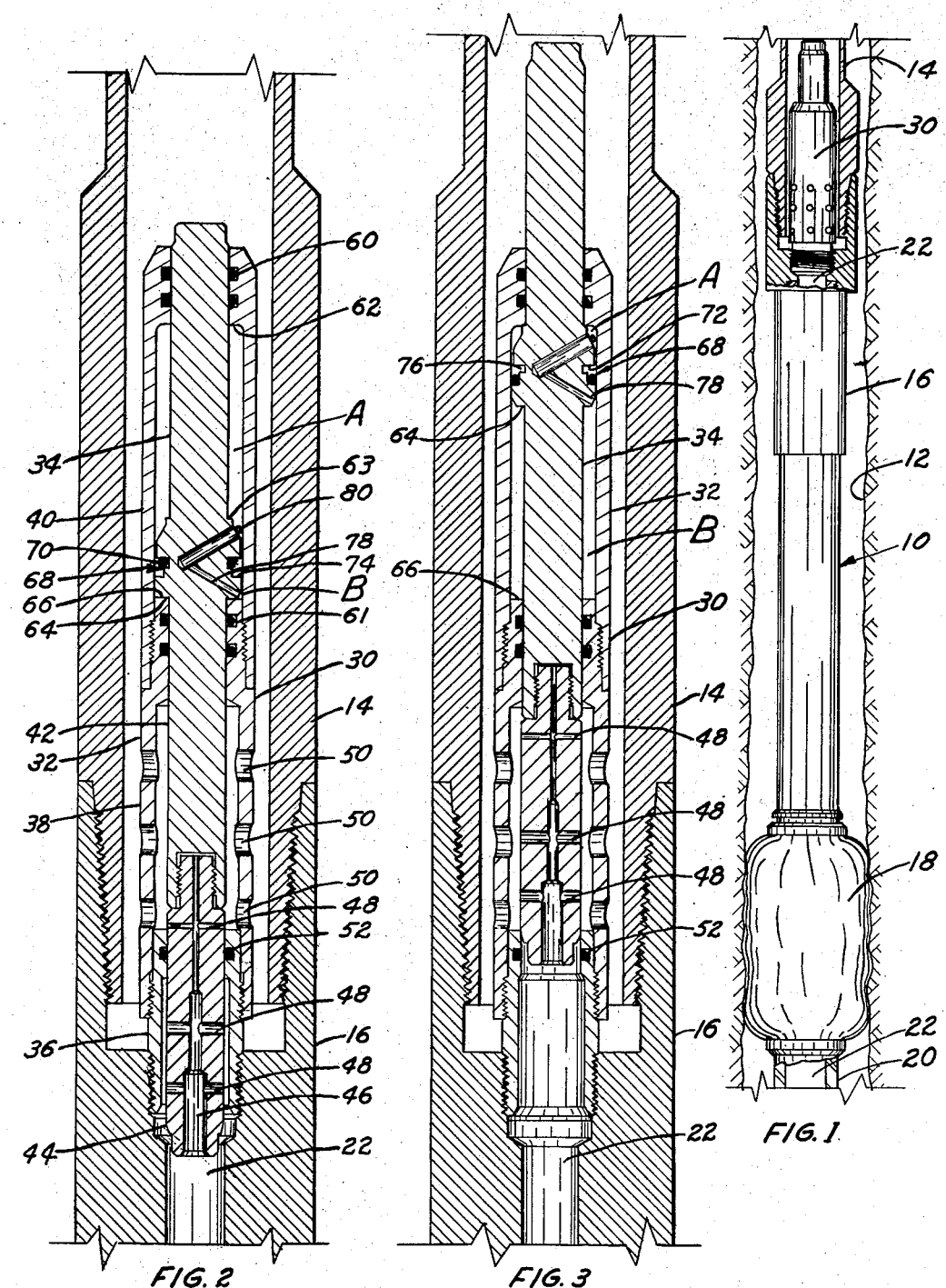

2,842,162
FLUID FLOW CONTROL DEVICE

Harry E. Schwegman, Duncan, Okla., assignor to Halliburton Oil Well Cementing Company, Duncan, Okla.

Application January 17, 1955, Serial No. 481,986

8 Claims. (Cl. 138—43)

This invention relates to fluid flow control devices and more particularly to such a device having variable flow capacity for fluids under pressure.

In certain operations involving the control of fluids under pressure it is desirable to vary automatically the flow capacity of a passageway and also to control the rate at which the flow capacity changes. This may be desirable, for example, where a sudden increase in flow capacity would permit excessive flow of fluids into or out of one portion of the system and thereby interfere with or prevent the performance of a subsequent operation or otherwise produce undesirable results.

This invention is applicable to variable-capacity flow control devices generally. As will appear more fully hereinafter, the invention has advantages which make it particularly suited for use in certain oil and gas well operations.

It is an object of this invention to provide an improved fluid flow control device having a flow capacity which is variable at a controlled rate.

It is another object of this invention to provide an improved fluid flow control device having provision whereby the flow capacity of the device changes at a controlled rate upon a force being applied thereto, by the fluids being controlled.

It is another object of this invention to provide an improved fluid flow control device in which the flow capacity of such device changes gradually in response to a sudden application of force due to a sudden change in the pressure of the fluids being controlled.

It is another object of this invention to provide an improved fluid flow control valve which is adapted to open at a controlled rate.

It is another object of this invention to provide an improved fluid flow control valve which automatically opens at a slow or gradual rate in response to a sudden application of force due, for example, to the high initial pressure of the fluids being controlled.

It is a further object of this invention to provide an improved fluid flow control valve for use in oil and gas well operations to control and delay changes in fluid flow resulting from sudden changes in fluid pressure.

According to the invention, there is provided a fluid flow control device having one or more movable walls which together with one or more stationary walls form a variable-capacity passageway for fluids under pressure. Upon fluids entering the passageway a force is applied to a movable wall to change the relative positions of the movable and stationary walls and thereby change the flow capacity of the passageway. Adjacent a surface of the movable wall, and remote from the passageway, there is confined a hydraulic fluid which is displaceable through a metering device upon a force being applied to the movable wall to vary the flow capacity of the passageway. The displacement of the hydraulic fluid through the metering device is at a rate which may be predetermined to control the change in flow capacity of the passageway which results from the force applied to the movable wall.

If desired, provision may be included for restoring the passageway to its initial flow capacity, such as by applying a force to the movable wall in a direction so that the movable and stationary walls resume their initial relative positions.

The foregoing and other objects and advantages of the invention will become more apparent from the following description when read in connection with the accompanying drawing, in which similar numerals refer to similar parts and wherein:

Figure 1 is an elevational view of a formation testing assembly positioned within the bore of an oil or gas well, the assembly including a fluid flow control device in accordance with the invention;

Figure 2 is a longitudinal cross-sectional view of a portion of the testing assembly of Figure 1, showing the fluid flow control device with its parts in the position occupied by them when the device has minimum flow capacity;

Figure 3 is a view similar to that of Figure 2, but showing the control device with its parts in the position occupied by them when the device has maximum flow capacity.

Referring to the drawing in detail, the invention is there illustrated as applied to an arrangement suited for use in connection with oil and gas well testing operations. In Figure 1 there is shown generally a formation testing assembly 10, which includes a fluid flow control device in accordance with the invention, but is otherwise of conventional construction. The assembly 10 is shown positioned within a well bore 12 after having been lowered to a desired depth therein on a drill pipe 14. The testing assembly 10 includes a testing tool 16 connected to the lower end of the drill pipe 14, a well packer 18 shown expanded into fluid-tight sealing engagement with the wall of the well bore 12 below the testing tool 16, and an anchor pipe 20 extending downwardly from the packer 18. Within the testing assembly 10 there is provided a passageway 22 through which fluids or the like may be withdrawn from the portion of the well bore 12 below the packer 18. The passageway 22 extends generally axially through the anchor pipe 20, the packer 18 and the testing tool 16.

A tester valve of conventional design is provided in the testing tool 16 and is operable to selectively open and close the passageway 22 at a point intermediate its length. Tester valves of this type are well known in the art and it is believed unnecessary to describe their operation in detail. As commonly constructed, such valves when opened permit a sudden surge of fluids to flow upwardly into the drill pipe or other conduit above the testing tool.

The present invention is concerned with a fluid flow control device which may be included in the testing assembly 10 and used in connection therewith to automatically control the sudden upward surge of fluids resulting from the sudden opening of the tester valve. In the arrangement of Figure 1 the fluid flow control device is shown as a control valve 30 connected in the assembly 10 above the testing tool 16.

As shown best in Figures 2 and 3, the upper end portion of the testing tool 16 is suitably recessed for receiving the lower end of the drill pipe 14, which is shown threadedly or otherwise connected thereto. In addition, the recessed portion of the testing tool 16 is suitably counterbored for receiving the lower end of the control valve 30, which is shown threadedly or otherwise connected to the walls of the central passageway 22. Thus, the control valve 30 is supported by and extends upwardly from the testing tool 16 and is preferably positioned in spaced relation to the inner wall of the drill pipe 14.

The control valve 30 includes one or more movable walls which together with one or more stationary walls form a variable-capacity passageway for fluids under pressure reaching the upper end of the passageway 22. As illustrated, the stationary walls are provided by an outer housing 32 supported by the testing tool 16, while the movable walls are provided by an inner mandrel 34 mounted for sliding movement within the housing 32.

For convenience of assembly, or for other reasons, the housing 32 and the mandrel 34 may each be made of several parts screwed or otherwise connected together. Thus, the housing 32 is shown as including a lower portion 36 screwed into and extending upwardly from the testing tool 16, an intermediate portion 38 screwed onto the lower portion 36, and an upper portion 40 screwed onto the intermediate portion 38. The mandrel 34 is shown as including an elongated body portion 42 into the lower end of which is screwed a lower or choke portion 44.

The control valve 30 has an inlet for fluids under pressure reaching the upper end of the passageway 22 and has an outlet through which these fluids may enter the drill pipe 14 when the control valve is not closed. As illustrated, the fluid inlet is provided by a central bore 46 extending lengthwise of the choke portion 44 and facing into the passageway 22, while the fluid outlet is provided by lateral ports 50 suitably arranged in the housing 32.

To prevent fluids from flowing upwardly around the mandrel 34 directly to the ports 50, a fluid-tight seal is preferably provided between the housing 32 and the mandrel 34 below the ports 50 by suitable means, such as by sealing ring 52. Thus, the fluids reaching the upper end of the passageway 22 are directed into the bore 46, which has radial branches 48 terminating between the mandrel 34 and the housing 32.

It will be noted that the control valve 30 is in effect connected in the testing assembly 10 between the passageway 22 and the drill pipe 14, the arrangement being such that the quantity of fluids permitted at any instant to enter the drill pipe 14 from the portion of the well bore 12 below the packer 18 is determined by the flow capacity of the control valve 30. In the arrangement illustrated, the flow capacity of the control valve 30 at any instant is determined by the relative position of the slidable mandrel 34 within the housing 32.

For oil and gas well testing and certain other applications, it is generally desirable for the control valve 30 to have a plurality of positions, such as a position of minimum flow capacity, one or more positions of intermediate flow capacity, and a position of maximum flow capacity. To this end, the central bore 46 in the mandrel 34 is shown provided with a plurality of radial branches 48 terminating at points longitudinally spaced on the mandrel 34. With this arrangement the flow capacity of the valve 30 is minimum when the mandrel 34 is in its lowermost position within the housing 32. Upon the mandrel 34 being moved upwardly within the housing 32, the flow capacity of the valve 30 increases in accordance with the number and respective flow capacities of the particular branches 48 which become exposed above the sealing ring 52. Various equivalent and equally suitable arrangements may be employed whereby the flow capacity of the control valve 30 increases upon the mandrel 34 being moved upwardly within the housing 32.

If desired, the control valve 30 may be constructed and arranged so that its flow capacity increases gradually, rather than in successive steps, in response to relative upward movement of the mandrel 34 within the housing 32. For example, the choke portion 44 of the mandrel 34 may be constructed as a solid elongated body having an outer surface adjacent the housing 32 tapering inwardly and downwardly toward the passageway 22. With this and similar arrangements which may, if desired, be used the flow capacity of the valve 30 may pass through an infinite number of intermediate positions between minimum and maximum as the mandrel 34 moves upwardly within the housing 32.

Where it is desirable for the valve 30 to have a closed position, with no flow capacity, any of various suitable arrangements may be employed whereby fluids are prevented from passing into the drill pipe 14 when the mandrel 34 is in its lowermost position. In the arrangement illustrated, for example, the choke portion 44 may be constructed and arranged so that none of the branches 48 terminates above the sealing ring 52 when the mandrel 34 is in its lowermost position with the housing 32.

An important feature of the invention is the arrangement whereby the rate of change of the flow capacity of the control valve 30 is automatically controlled. In this connection it should be noted that the flow capacity of the valve 30 is determined, as previously stated, by the relative position of the slidable mandrel 34 with respect to the housing 32. In the arrangement shown, the rate of increase of the flow capacity may be controlled by controlling the rate at which the mandrel 34 moves upwardly within the housing 32 when a force is applied thereto by fluids reaching the upper end of the passageway 22.

For the purpose of controlling the rate of upward movement of the mandrel 34 within the housing 32, a hydraulic fluid is confined within container means which holds it adjacent and in displaceable relation to a surface of the mandrel 34 remote from the fluids being controlled. The hydraulic fluid is preferably displaceable at a very slow rate as the mandrel 34 moves upwardly and, accordingly, delays upward movement of the mandrel 34. The rate of displacement of the hydraulic fluid may be predetermined to be much slower than the rate at which the fluids being controlled tend to move the mandrel 34 in a direction to open the valve 30.

As illustrated, the hydraulic fluid is confined within an annular space suitably provided between the mandrel 34 and the housing 32 above the ports 50. Fluid-tight seals are preferably provided (for example, by sealing rings 60 and 61) between the mandrel 34 and the housing 32 above and below the annular space.

It will be noted that the mandrel 34 acts somewhat as a piston within the container means confining the hydraulic fluid. That is, relative sliding movement is permitted between the mandrel 34 and the housing 32, but shoulders 62 and 63 are provided to prevent complete separation due to relative upward movement of the mandrel 34. In addition, shoulders 64 and 66 may be provided to prevent complete separation due to relative downward movement of the mandrel 34.

It will be further noted that the annular space in which the hydraulic fluid is confined is in effect two chambers, designated chamber A and chamber B, separated by a fluid-tight seal. For certain applications it may be satisfactory for the fluid-tight seal between the chambers A and B to be provided by a sealing ring similar to the rings 52, 60 and 61 previously referred to.

In many applications it is desirable for the mandrel 34 to be readily and simply returnable to its lowermost position within the housing 32 after an operation has been completed. For this purpose means is preferably provided whereby the hydraulic fluid can by-pass the sealing ring or the like during the return stroke. Also, the mandrel 34 is preferably constructed, as shown, so that the upper end thereof is at all times exposed above the housing 32 and is, therefore, accessible for the application of force by manual or other means to move it downwardly toward its lowermost position within the housing 32. For example, a weighted object or ball may be dropped to return the mandrel 34 to its lowermost position while the tool is in a well or it may be moved downwardly by hand after the tool is withdrawn from the well.

As illustrated, the fluid-tight seal between the chambers A and B is provided by a one-way O-ring check valve 68. The check valve 68 automatically closes to prevent hydraulic fluid from flowing downwardly past it while there is relative upward movement of the mandrel 34 within the housing 32, but if desired, can readily be opened to permit return of the mandrel 34 to its lowermost position after the force tending to open the valve 30 is no longer being applied.

As illustrated, the check valve 68 includes an O-ring 70 made of rubber or the like encircling the mandrel 34 between the shoulders 63 and 64. The O-ring 70 is adapted to move longitudinally with respect to the mandrel 34 between an upper abutment 72 and a lower abutment 74, which are suitably provided by an annular recess formed in the mandrel 34 between the shoulders 63 and 64.

Upon the mandrel 34 moving upwardly within the housing 32, the O-ring 70 is caused to move downwardly against the lower abutment 74. In such position the O-ring 70 provides a fluid-tight seal between the chambers A and B, with the result that the hydraulic fluid then present in the chamber A retards the opening of the control valve 30.

Upon the mandrel 34 moving downwardly within the housing 32, the O-ring 70 is caused to move upwardly against the upper abutment 72. Adjacent the upper abutment 72 there is an annular cavity 76 (shown best in Figure 3) providing clearance around the O-ring 70. Thus, when the O-ring 70 is in its upper position, there is no fluid-tight seal between the chambers A and B and the hydraulic fluid then present in chamber B is permitted to be readily displaced past the O-ring 70 to the chamber A, with the result that the hydraulic fluid does not appreciably retard relative downward movement of the mandrel 34.

It will be noted that the control valve 30 does not open unless the hydraulic fluid is displaced from the chamber A to the chamber B. The rate at which the valve 30 opens is controlled by permitting the hydraulic fluid to be displaced from the chamber A into the chamber B at a very slow rate. To this end, a restricted passageway 78 is provided between the chamber B and the chamber A. While any of various means may be employed for providing such a restricted passageway, there is illustrated a V-shaped passageway 78 extending into the mandrel 34 and having positioned in one of its arms a metering pin 80, which is adapted to permit the flow of fluid through the passageway 78 only at an extremely slow rate.

In operation the control valve 30 controls the sudden upward surge of fluids resulting from the opening of the tester valve and in effect applies the increased hydrostatic load to the packer 18 gradually instead of suddenly.

In Figure 2 the control valve 30 is shown with its parts in the positions occupied by them while the testing assembly 10 is being lowered into the well and prior to the opening of the tester valve. The mandrel 34 is in its lowermost position within the housing 32 and, accordingly, the flow capacity of the control valve 30 is minimum.

Upon the tester valve being opened, fluids under pressure surge upwardly through the passageway 22. Upon reaching the upper end of the passageway 22 the fluids apply a sudden force which tends to move the mandrel 34 upwardly within the housing 32.

As previously stated, the surge of fluids reaching the upper end of the passageway 22 after the tester valve opens is directed into the bore 46 of the mandrel 34. Since in the arrangement shown the uppermost radial branches 48 are exposed above the sealing ring 52 and communicate with the ports 50 when the mandrel 34 is in its lowermost position within the housing 32, a limited flow of fluids is permitted into the drill pipe 14 before the mandrel 34 begins to move upwardly.

As the mandrel 34 begins its upward stroke, the O-ring 70 is caused to move downwardly against the lower abutment 74, closing the check valve 68 and providing a fluid-tight seal between the chambers A and B. Continued upward movement of the mandrel 34 within the housing 32 displaces the hydraulic fluid in chamber A and causes it to flow through the restricted passageway 78 toward the chamber B. The metering pin 80 permits the hydraulic fluid to flow through the restricted passageway 78 only at an extremely slow rate, with the result that the upward stroke of the mandrel 34 is retarded.

As fluids continue to surge upwardly through the passageway 22, the mandrel 34 continues its upward stroke, but at a rate of travel which is controlled by the flow of the hydraulic fluid through the restricted passageway 78.

Upon the mandrel 34 moving upwardly within the housing 32 sufficiently to expose additional branches 48 above the sealing ring 52, the flow capacity of the control valve 30 increases, with the result that greater flow is permitted through the ports 50 into the drill pipe 14. As succeeding branches 48 become exposed above the sealing ring 52, even greater flow is permitted into the drill pipe 14. It is apparent that the flow capacity of the control valve 30 at any instant is determined by the number and flow capacities of the particular branches 48 which are at that time exposed above the sealing ring 52.

In Figure 3 the control valve 30 is shown with its parts in the positions occupied by them when the mandrel 34 is in its uppermost position within the housing 32 and the flow capacity therethrough is maximum. It will be noted that all of the branches 48 are shown exposed above the sealing ring 52. Due to frictional and other forces acting upon the mandrel 34, it will ordinarily remain in the uppermost position attained until the testing operation has been completed and the assembly 10 has been withdrawn from the well. Thereafter the mandrel 34 may be easily returned to its lowermost position by manually or otherwise sliding it downwardly within the housing 32, after which the control valve 30 will be in its position of minimum flow capacity and may be reused in other operations.

I claim:

1. A fluid flow control device comprising a housing, a mandrel mounted for sliding movement within said housing and forming therewith a passageway of variable flow capacity, said mandrel normally restricting the flow of fluids through said passageway and having a surface exposed to fluids entering said passageway, said mandrel being adapted upon sufficient force being applied thereto by fluids in said passageway to move within said housing in a direction such as to increase the flow capacity of said passageway, container means within said housing including a chamber remote from said passageway for holding a hydraulic fluid in displaceable relation to said mandrel, whereby said hydraulic fluid retards movement of said mandrel in such direction, and flow restricting means in communication with said chamber for permitting said hydraulic fluid to escape from said chamber at a very slow rate, whereby the flow capacity of said passageway increases gradually upon fluids under pressure suddenly entering said passageway.

2. A fluid flow control device comprising a housing, a mandrel mounted for sliding movement within said housing and forming therewith a passageway of variable flow capacity, said mandrel being adapted upon being moved in one direction within said housing to increase the flow capacity of said passageway and upon being moved in an opposing direction within said housing to decrease the flow capacity of said passageway, means responsive to the pressure differential action of fluids in said passageway for causing said mandrel to move in said one direction within said housing, manually operable means for causing said mandrel to move in said opposing direction within said housing, container means including a chamber remote from said passageway for holding a hydraulic fluid in displaceable relation to said mandrel, valve means operatively connected with said mandrel and operable automatically and selectively to effect a seal confining said hydraulic fluid within said chamber upon movement of said mandrel in said one direction and to remove said seal upon movement of said mandrel in said opposing direction, and flow restricting means including a metering device communicating with said chamber for permitting said hydraulic fluid to escape from said chamber at a controlled rate upon movement of said mandrel in said one direction.

3. A fluid flow control device comprising a housing having an inlet and an outlet for fluids, a mandrel extending into said housing and having a choke portion with a surface exposed to fluids entering said housing through said inlet, said choke portion forming with said housing a normally restricted passageway between said inlet and said outlet, said mandrel being mounted for sliding movement within said housing to change the relative position of said choke portion therein and thereby change the flow capacity of said passageway, said mandrel being adapted upon moving in one direction within said housing to increase the flow capacity of said passageway and being movable in said one direction upon sufficient force being applied to the exposed surface of said choke portion by fluids in said passageway, said housing having a chamber therein for confining a hydraulic fluid adjacent and in displaceable relation to a surface of said mandrel remote from said passageway, and a fluid metering device communicating with said chamber for permitting said hydraulic fluid to escape from said chamber at an extremely slow rate upon movement of said mandrel in said one direction, the arrangement being such as to substantially retard the movement of said mandrel in said one direction and thereby control the rate of increase of flow capacity of said passageway.

4. A fluid flow control valve comprising a housing, an elongated valve body extending into said housing and forming therewith a normally restricted passageway for fluids under pressure, said body being mounted for sliding movement within said housing to open said passageway to greater fluid flow upon sufficient force being applied to said body by fluids entering said passageway, a chamber within said housing remote from said passageway for holding a hydraulic fluid in displaceable relation to a surface of said valve body, a one-way O-ring check valve encircling said valve body and adapted when closed to effect a fluid-tight seal with a wall of said chamber and thereby confine hydraulic fluid within a portion of said chamber, said check valve being operable to automatically close upon movement of said body in a direction to open said passageway and to automatically open upon return of said body toward its normal position within said housing, and a fluid metering device for permitting hydraulic fluid to flow at a controlled rate between portions of said chamber on either side of said check valve, the arrangement being such that upon said valve body moving in a direction to open said passageway said check valve closes permitting hydraulic fluid displaced by said body to escape from one portion of said chamber to another portion of said chamber only at a controlled rate through said metering device and upon return of said valve body to its normal position within said housing said check valve opens permitting hydraulic fluid displaced by said body to by-pass said metering device.

5. Apparatus for controlling the flow of fluids under pressure comprising a housing, walls forming a fluid passageway in said housing, at least one wall being responsive to force applied thereto by the fluids being controlled to move with respect to another wall and thereby change the flow capacity of said passageway, container means within said housing including a chamber remote from said passageway for holding a hydraulic fluid in displaceable relation to said movable wall, and flow restricting means in communication with said chamber for controlling the displacement of said hydraulic fluid and thereby controlling the change of flow capacity of said passageway resulting from force applied to said movable wall by the fluids being controlled.

6. Apparatus for controlling the flow of fluids under pressure comprising a housing, walls forming a passageway in said housing for the fluids being controlled, at least one wall being responsive to force applied thereto by the fluids being controlled to move with respect to another wall in a direction such as to change the flow capacity of said passageway, container means including two chambers within said housing, one of said chambers being adapted to hold a hydraulic fluid in displaceable relation to a surface of said movable wall remote from said passageway and the other of said chambers being adapted to receive hydraulic fluid displaced upon movement of said movable wall, and flow restricting means providing fluid communication at a controlled rate between said two chambers for thereby controlling the change of flow capacity of said passageway resulting from force applied to said movable wall by the fluids being controlled.

7. Apparatus as claimed in claim 6, including a check valve between said two chambers, the arrangement being such that said check valve substantially prevents hydraulic fluid from by-passing said flow restricting means upon movement of said movable wall in one direction due to force applied thereto by the fluids being controlled but permits said hydraulic fluid to by-pass said flow restricting means upon movement of said movable wall in an opposing direction.

8. A fluid flow control device comprising a housing having a passageway therethrough for fluids under pressure, an elongated body mounted for sliding movement within said housing, said body being responsive to force applied thereto by the fluids being controlled to move within said housing in one direction to change the flow capacity of said passageway and being thereafter movable within said housing in the opposing direction to again change the flow capacity of said passageway, container means including two chambers within said housing, one chamber being adapted to hold a hydraulic fluid in displaceable relation to a surface of said body remote from said passageway and the other chamber being adapted to receive the hydraulic fluid displaced upon movement of said body within said housing, a fluid metering device interconnecting said two chambers for permitting hydraulic fluid to flow therebetween at a predetermined rate, and a one-way check valve between said chambers operatively connected to said body, said check valve being adapted to close upon movement of said body in said one direction and thereby prevent said hydraulic fluid from by-passing said metering device and being adapted to open upon movement of said body in said opposing direction and thereby permit said hydraulic fluid to by-pass said metering device.

References Cited in the file of this patent

UNITED STATES PATENTS

| | | |
|---|---|---|
| 2,042,103 | Hyde et al. | May 26, 1936 |
| 2,211,416 | Goldsmith | Aug. 13, 1940 |
| 2,380,022 | Burt | July 10, 1945 |
| 2,541,464 | Davies | Feb. 13, 1951 |
| 2,559,244 | Erling | July 3, 1951 |
| 2,614,793 | Storm | Oct. 21, 1952 |
| 2,655,217 | Bagwell | Oct. 13, 1953 |
| 2,662,554 | Singer | Dec. 15, 1953 |